United States Patent
Lange et al.

(10) Patent No.: US 7,188,015 B2
(45) Date of Patent: Mar. 6, 2007

(54) METHOD AND SYSTEM FOR CONTROLLING A MOBILE MACHINE

(75) Inventors: Arthur Lange, Sunnyvale, CA (US); James Veneziano, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 147 days.

(21) Appl. No.: 10/892,002

(22) Filed: Jul. 14, 2004

(65) Prior Publication Data

US 2006/0015251 A1    Jan. 19, 2006

(51) Int. Cl.
*G06F 19/00* (2006.01)
(52) U.S. Cl. .............................. 701/50; 701/213; 172/2
(58) Field of Classification Search ................. 701/23, 701/41, 50, 207, 213, 214; 318/580, 587; 180/443, 446; 172/2, 4.5; 56/10.2 A, 10.2 R
See application file for complete search history.

(56) References Cited

U.S. PATENT DOCUMENTS

| | | | |
|---|---|---|---|
| 3,648,539 A | 3/1972 | Rouis | |
| 4,453,485 A | 6/1984 | Houghton-Brown et al. | |
| 4,515,221 A | 5/1985 | van der Lely | |
| 5,121,799 A | 6/1992 | Barnes et al. | |
| 5,563,786 A | 10/1996 | Torii | |
| 5,941,917 A | 8/1999 | Barnes et al. | |
| 6,052,647 A * | 4/2000 | Parkinson et al. | 701/215 |
| 6,236,924 B1 | 5/2001 | Motz et al. | |
| 6,539,303 B2 * | 3/2003 | McClure et al. | 701/213 |
| 2004/0186644 A1 * | 9/2004 | McClure et al. | 701/50 |
| 2004/0210357 A1 | 10/2004 | McKay et al. | |
| 2005/0288834 A1 * | 12/2005 | Heiniger et al. | 701/23 |
| 2006/0015228 A1 * | 1/2006 | Lange | 701/41 |
| 2006/0015229 A1 * | 1/2006 | Lange et al. | 701/41 |
| 2006/0064216 A1 * | 3/2006 | Palmer | 701/41 |
| 2006/0116798 A1 * | 6/2006 | Gibson et al. | 701/26 |

FOREIGN PATENT DOCUMENTS

| | | |
|---|---|---|
| EP | 0556689 | 8/1993 |
| EP | 1269819 | 1/2003 |
| FR | 2686432 | 7/1993 |
| WO | WO 2004/095198 A2 | 4/2004 |

* cited by examiner

*Primary Examiner*—Gary Chin (57) ABSTRACT

Embodiments of the present invention recite system for controlling a mobile machine. In one embodiment the system comprises a position determining component for determining the geographic position of the mobile machine. The system further comprises a steering component for controlling the steering mechanism of the mobile machine in response to a message. The system further comprises a control component coupled with the position determining component and with the steering component. The control component generates a message to the steering component in response to receiving position data from the position determining component.

29 Claims, 10 Drawing Sheets

METHOD AND SYSTEM FOR CONTROLLING A MOBILE MACHINE

FIELD OF THE INVENTION

Embodiments of the present invention are directed to controlling a mobile machine. More specifically, embodiments of the present invention relate to a guidance system for controlling a mobile machine.

BACKGROUND OF THE INVENTION

Operating agricultural vehicle such as tractors and harvesters often requires highly repetitive operations. For example, when plowing or planting a field, an operator must make repeated passes across a field. Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human. Many rely upon furrow followers which mechanically detect whether the vehicle is moving parallel to a previously plowed plant furrow. However, these guidance systems are most effective in flat terrain and when detecting furrows plowed in a straight line. Additionally, many of these systems require factory installation and are too expensive or inconvenient to facilitate after market installation.

SUMMARY OF THE INVENTION

Accordingly, a need exists for system which is suitable guiding mobile machines such as agricultural vehicles. While meeting the above stated need, it is also desirable that the guidance system is suitable for after market installation in those vehicles.

Embodiments of the present invention recite system for controlling a mobile machine. In one embodiment the system comprises a position determining component for determining the geographic position of the mobile machine. The system further comprises a steering component for controlling the steering mechanism of the mobile machine in response to a message. The system further comprises a control component coupled with the position determining component and with the steering component. The control component generates a message to the steering component in response to receiving position data from the position determining component.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1A:
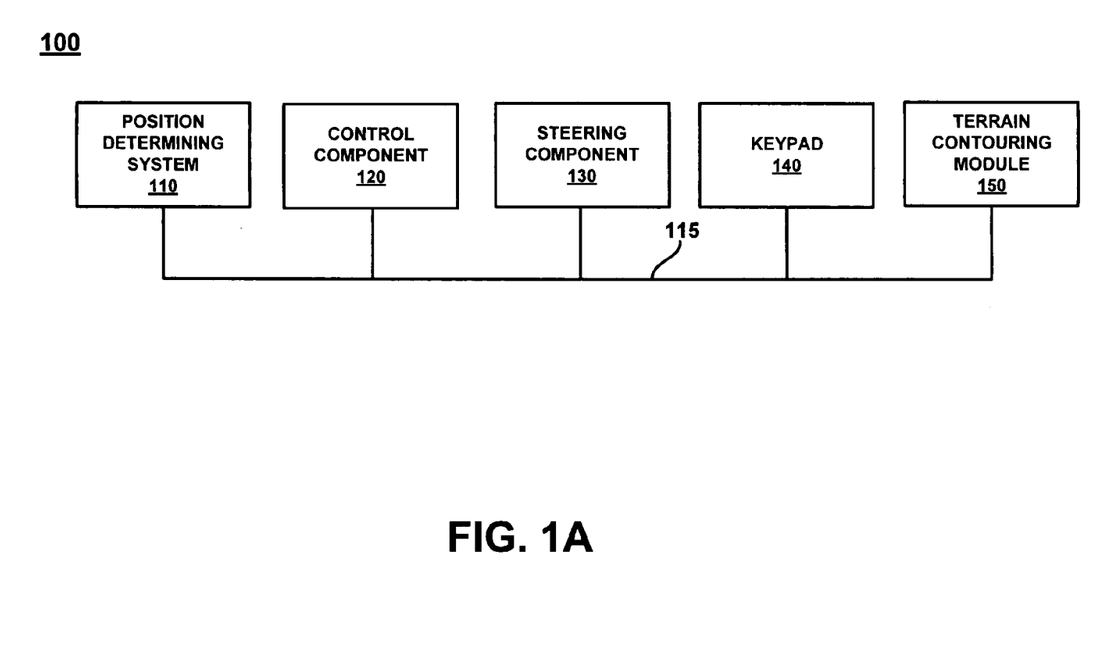
FIGS. 1A and 1B show an exemplary system for controlling a mobile machine in accordance with embodiments of the present invention.
Figure 1B:
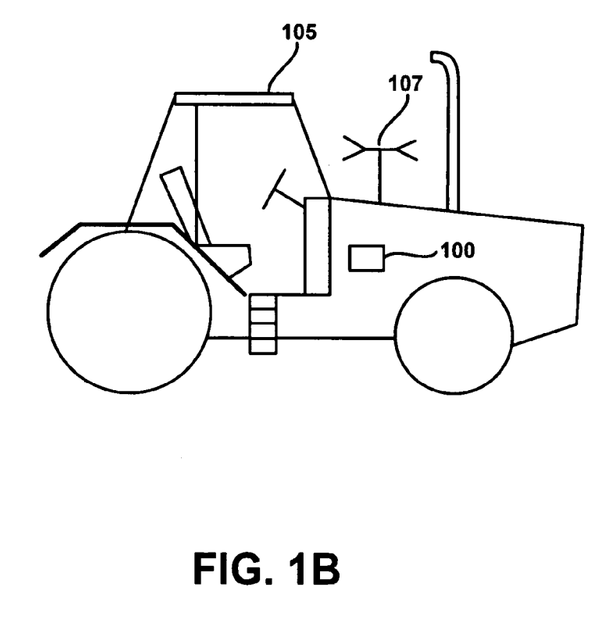

FIG. 1 is a block diagram of an exemplary system 100 for controlling a mobile machine 105 in accordance with embodiments of the present invention. In FIG. 1, a position determining system is coupled with a control component 120 and a steering component 130 via a communication network or coupling 115. Additionally, system 100 may comprise an optional keypad 140 and/or a terrain compensation module component (e.g., TCM 150) which are also coupled with coupling 115.

In embodiments of the present invention, coupling 115 is a serial communications bus. In one embodiment, coupling 115 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture.

Position determining system 110 determines the geographic position of mobile machine 105. For the purposes of the present invention, the term "geographic position" means the determining in at least two dimensions (e.g., latitude and longitude), the location of mobile machine 105. In one embodiment of the present invention, position determining system 110 is a satellite based position determining system and receives navigation data from satellites via antenna 107 of FIG. 1B. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

In embodiments of the present invention, control component 120 receives position data from position determining system 110 and generates commands for controlling mobile machine 105. In embodiments of the present invention, mobile machine 105 is an agricultural vehicle such as a tractor, a harvester, etc. However, embodiments of the present invention are well suited for controlling other vehicles such as snow plows, road salting, or roadside spraying equipment as well. In one embodiment, is response to position data received from position determining system 110, control component 120 generates a message (e.g., a steering command) to steering component 130 which then controls the steering mechanism of mobile machine 105. In embodiments of the present invention, control component 120 is operable for generating steering commands to an electrical steering component and a hydraulic steering component depending upon the configuration of system 100.

In embodiments of the present invention, keypad 130 provides additional input/output capabilities to system 100. In embodiments of the present invention, keypad 130 may also comprise a device drive 131 which allows reading a media storage device such as a compact disk (CD), a digital versatile disk (DVD), a memory stick, or the like. This allows, for example, integrating data from various software applications such as mapping software in order to facilitate controlling the movement of mobile machine 105. For example, field boundaries can be easily input into system 100 to facilitate controlling the movement of mobile machine 105.

TCM 150 provides the ability to compensate for terrain variations which can reduce the precision of position determining system 110 in determining the geographic position of mobile machine 105. For example, when traversing a hillside, the antenna 107 of the position determining system 110 can be displaced to one side or the other with respect to the center line of mobile machine 105, thus causing errors in determining the geographic position of mobile machine 105. As a result, gaps or overlaps can occur when plowing across contoured terrain is being performed. TCM 150 can detect the magnitude of displacement of antenna 107 with respect to the center line of mobile machine 105 (e.g., due to roll, pitch, and yaw) and send signals which allow control component 120 to generate steering commands which compensate for the errors in determining the geographic position of mobile machine 105. It is appreciated that the components described with reference to FIG. 1 may be implemented as separate components. However, in embodiments of the present invention, these components may be integrated as various combinations of discreet components, or as a single device.

Figure 2:
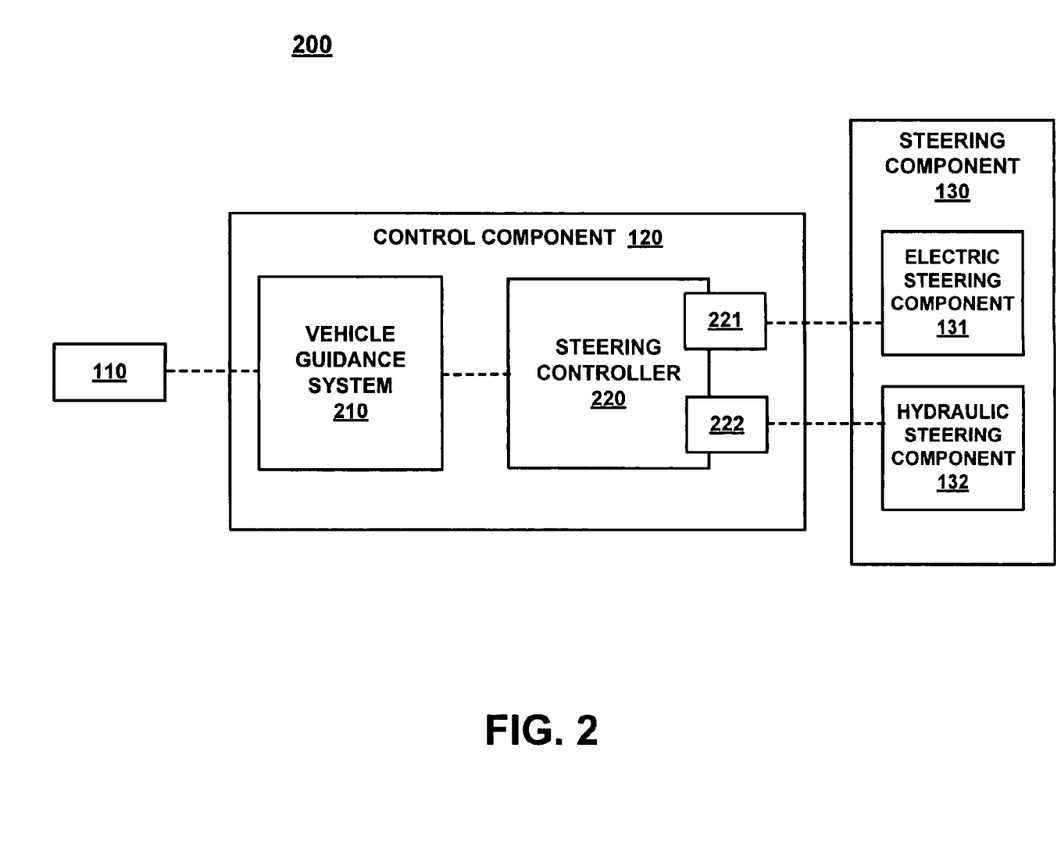
FIG. 2 shows an exemplary system architecture in accordance with embodiments of the present invention.

FIG. 2 shows an exemplary system architecture 200 in accordance with embodiments of the present invention. In the embodiment of FIG. 2, control component 120 comprises a vehicle guidance system 210 which is coupled with a steering controller 220. It is appreciated that in embodiments of the present invention, vehicle guidance system 210 and steering controller 220 may be implemented as a single unit, or separately. Implementing steering controller 220 separately is advantageous in that it facilitates implementing the present invention as an after market kit which can be easily added to an existing vehicle navigation system. As a result, the costs for components and for installation of the control system of the present invention are reduced. However, embodiments of the present invention are well suited to be factory installed as original equipment for mobile machine 105 as well.

In embodiments of the present invention, vehicle guidance system 210 uses position data from position determining system 110, user input such as a desired pattern or direction, as well as vector data such as desired direction and distance to determine course corrections which are used for guiding mobile machine 105. Roll, pitch, and yaw data from TCM 150 may also be used to determine course corrections for mobile machine 105. For purposes of the present invention, the term "course correction" means a change in the direction traveled by mobile machine 105 such that mobile machine 105 is guided from a current direction of travel to a desired direction of travel. In embodiments of the present invention, vehicle guidance system 210 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, vehicle guidance system 210 may generate steering commands which cause mobile machine 105 to move 15 feet to one side in the next pass. Vehicle guidance system 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide mobile machine 105 in these conditions. In embodiments of the present invention, position determining component 110 may be integrated into vehicle guidance system 210 or may be a separate unit. Additionally, as stated above with reference to FIG. 1, position determining component 110, control component 120 and steering component 130 may be integrated into a single unit in embodiments of the present invention.

In embodiments of the present invention, the course correction calculated by vehicle guidance system 210 is sent from vehicle guidance system 210 to steering controller 220. Steering controller 220 translates the course correction generated by guidance system 210 into a steering command for manipulating the steering mechanism of mobile machine 105. Steering controller 220 generates a message conveying the steering command to steering component 130. In embodiments of the present invention, the communicative coupling between vehicle guidance system 210, steering controller 220 and steering component 130 is accomplished using coupling 115 (e.g., a serial bus, or CAN bus).

In embodiments of the present invention, steering component 130 may comprise an electric steering component 131, or a hydraulic steering component 132. Thus, as shown in FIG. 2, steering controller 220 comprises a first output 221 for coupling steering controller 220 with electric steering component 131, and a second output 222 for coupling steering controller 220 with hydraulic steering component 132. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 131. If steering controller 220 determines that output 222 is being used, it generates a steering command which is formatted for controlling hydraulic steering component 132.

Figure 3A:
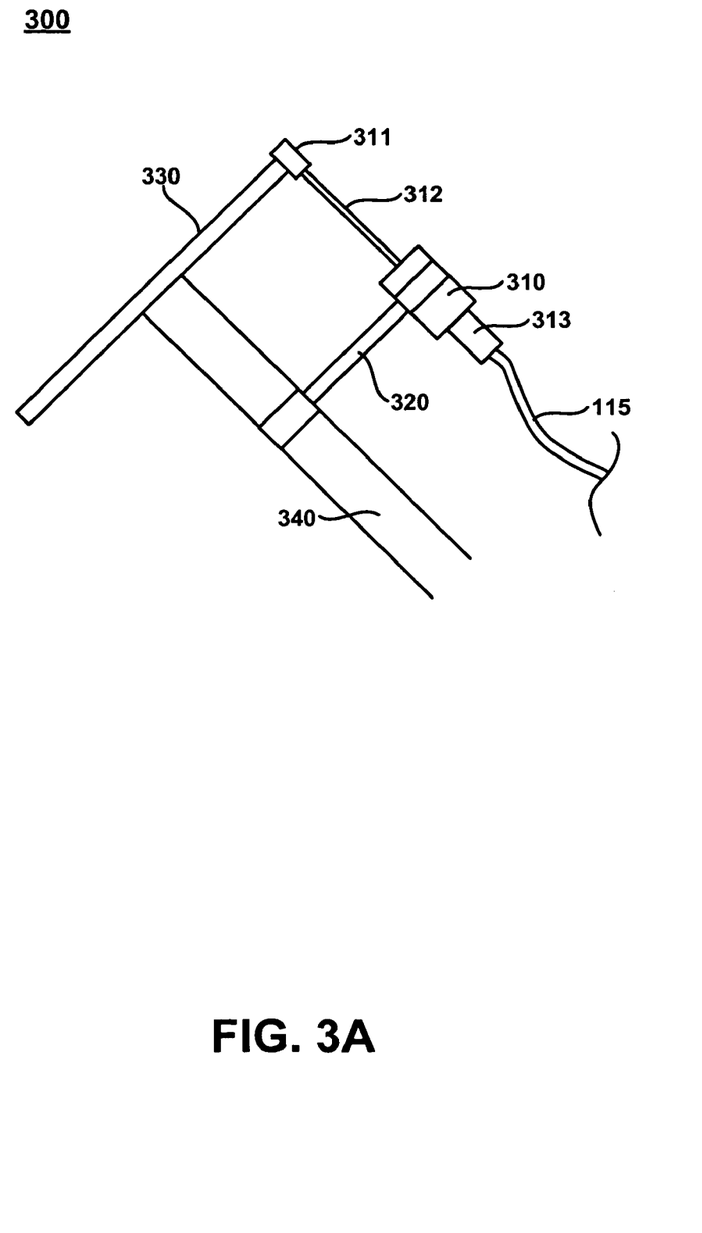
FIGS. 3A and 3B show side and top views respectively of a system for controlling a mobile machine in accordance with embodiments of the present invention.
Figure 3B:
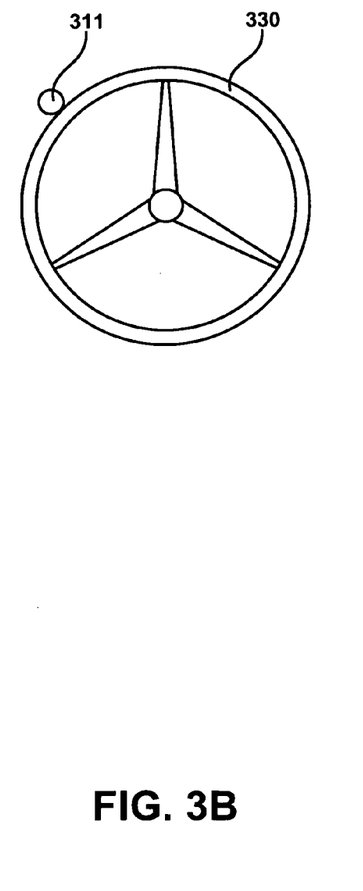

FIGS. 3A and 3B show side and top views respectively of a system 300 for controlling a mobile machine in accordance with embodiments of the present invention. In the embodiment of FIG. 3A, a steering component (e.g., electric steering component 131 of FIG. 2) comprises an electric motor 310 which is coupled with an actuator device via a shaft 312. In the embodiment of FIG. 3A, actuator device comprises a drive wheel 311 which is in contact with steering wheel 330 of mobile machine 105. In embodiments of the present invention, electric motor 310 may be directly coupled with drive wheel 311, or may be coupled via a low ratio gear (not shown). Using these methods to couple electric motor 313 and drive wheel 311 are advantageous in that a smaller electric motor can be used while still generating sufficient torque to control steering wheel 330. Thus, if a user wants to manually steer mobile machine 105, the user will encounter less resistance from electric motor 310 when it is disengaged.

Electric steering component 131 further comprises a motor control unit 313 is coupled with electric motor 310 and with a control component 120 of FIG. 2 via coupling 115. In FIG. 3A, electric motor 310 is coupled with the steering column 340 via a bracket 320. It is appreciated that in embodiments of the present invention, electric motor 310 may be coupled with steering column 340 using another apparatus than bracket 320. For example, in one embodiment, electric motor 310 may be coupled with a bracket which is attached via suction cups with the windshield or dashboard of mobile machine 105. In another embodiment, electric motor 310 may be coupled with a pole which is extended between the floor and roof of mobile machine 105. Furthermore, while the present embodiment shows motor control unit 313 directly coupled with electric motor 310, embodiments of the present invention are well suited to utilize other configurations. For example, in one embodiment motor control unit 313 may be implemented as a sub-component of control unit 120 and may only send a control voltage to electric motor 310 via an electrical coupling (not shown). In another embodiment, motor control unit 313 may be implemented as a separate unit which is communicatively coupled with control unit 120 via coupling 115 and with electric motor 310 via an electrical coupling (not shown).

In embodiments of the present invention, drive wheel 311 is coupled with steering wheel 330 with sufficient friction such that rotation of drive 311 causes rotation of steering wheel 330. In embodiments of the present invention, a spring (not shown) maintains sufficient pressure for coupling drive wheel 311 with steering wheel 330. However, the spring does not maintain sufficient pressure between drive wheel 311 and steering wheel 330 to pinch a user's fingers if, for example, the user is manually steering mobile machine 105 and the user's fingers pass between drive wheel 311 and steering wheel 330.

In embodiments of the present invention, electric motor 310 is reversable, thus, depending upon the steering command sent from control component 120, motor control unit 313 controls the current to electric motor 310 such that it rotates in a clockwise of counter-clockwise direction. As a result, steering wheel 330 is turned in a clockwise or counter-clockwise direction as well. Typically, the current running through electric motor 310 is calibrated so that drive wheel 311 is turning steering wheel 330 without generating excessive torque. This facilitates allowing a user to override electric steering component 131. In embodiments of the present invention, electric motor 310 may be a permanent magnet brush direct current (DC) motor, a brushless DC motor, a stepper motor, or an alternating current (AC) motor.

In embodiments of the present invention, motor control unit 313 can detect when a user is turning steering wheel 330 in a direction counter to the direction electric steering component 131 is turning. For example, a shaft encoder (not shown) may be used to determine which direction shaft 312 is turning. Thus, when a user turns steering wheel 330 in a direction which counters the direction electric motor 310 is turning, the shaft encoder detects that the user is turning steering wheel 330 and generates a signal to motor control unit 313. In response to determining that a user is turning steering wheel 330, motor control unit 313 can disengage the power supplied to electric motor 310. As a result, electric motor 310 is now freewheeling and can be more easily operated by the user. In another embodiment, motor control unit 313 when steering wheel 330 is turned counter to the direction electric motor is turning, a circuit in motor control unit 313 detects that electric motor 310 is stalling and disengages the power supplied to electric motor 310. In another embodiment, a switch detects the rotation of steering wheel 330 and sends a signal to motor control unit 313. Motor control unit 313 can then determine that the user is manually steering mobile machine 105 and disengage electric motor 310. As a result, when a user turns steering wheel 330, their fingers will not be pinched if they pass between drive wheel 311 and steering wheel 330 because electric motor 310 is freewheeling when the power is disengaged.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIG. 3 can be easily bolted onto steering column 340 and coupled with steering controller 220. Additionally, electric motor 310 can be fitted to a variety of vehicles by simply exchanging bracket 320 for one configured for a particular vehicle model. Furthermore, embodiments of the present invention do not rely upon furrow feelers which typically must be raised from and lowered into a furrow when the end of the furrow is reached. As a result, less time is lost in raising or lowering the furrow feeler.

Figure 4A:
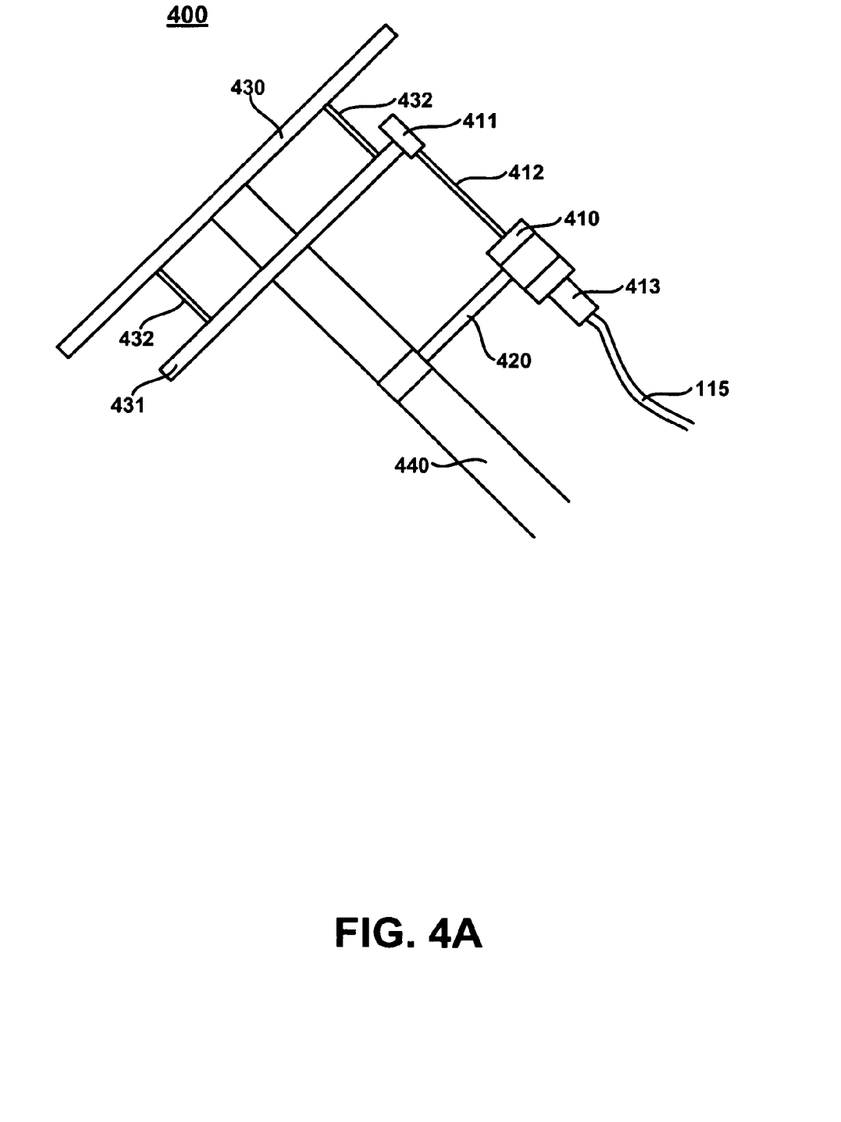
FIGS. 4A and 4B show side and top views respectively of a system for controlling a mobile machine in accordance with embodiments of the present invention.
Figure 4B:
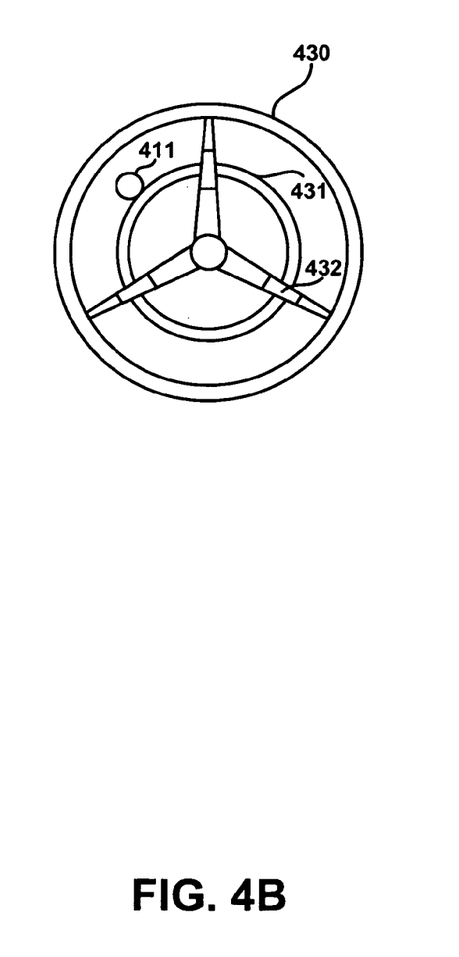

FIGS. 4A and 4B show side and top views respectively of a system 400 for controlling a mobile machine in accordance with embodiments of the present invention. In FIG. 4A, the steering component (e.g., electric steering component 131 of FIG. 2) comprises an electric motor 410 which is coupled with drive wheel 411 via shaft 412 and a motor control unit 413. Motor control unit 413 couples electric motor 410 with steering controller 220 of FIG. 2. In FIG. 4A, electric motor 410 is with steering column 440 via bracket 420. In the embodiment of FIGS. 4A and 4B, drive wheel 411 is coupled with a sub wheel 431 which is coupled with steering wheel 330 via brackets 432.

In the embodiment of FIGS. 4A and 4B, electric motor 410 turns in a clockwise or counter-clockwise direction depending upon the steering command received by motor control unit 413. As a result, drive wheel 411 causes sub wheel 431 to turn in clockwise or counter clockwise direction as well. Utilizing sub wheel 431 prevents a user's fingers from being pinched between steering wheel 430 and drive wheel 411 if the user chooses to manually steer the vehicle. In embodiments of the present invention, sub wheel 431 can be easily and quickly coupled with steering wheel 430 by, for example, attaching brackets 432 to the spokes of steering wheel 430.

Figure 5A:
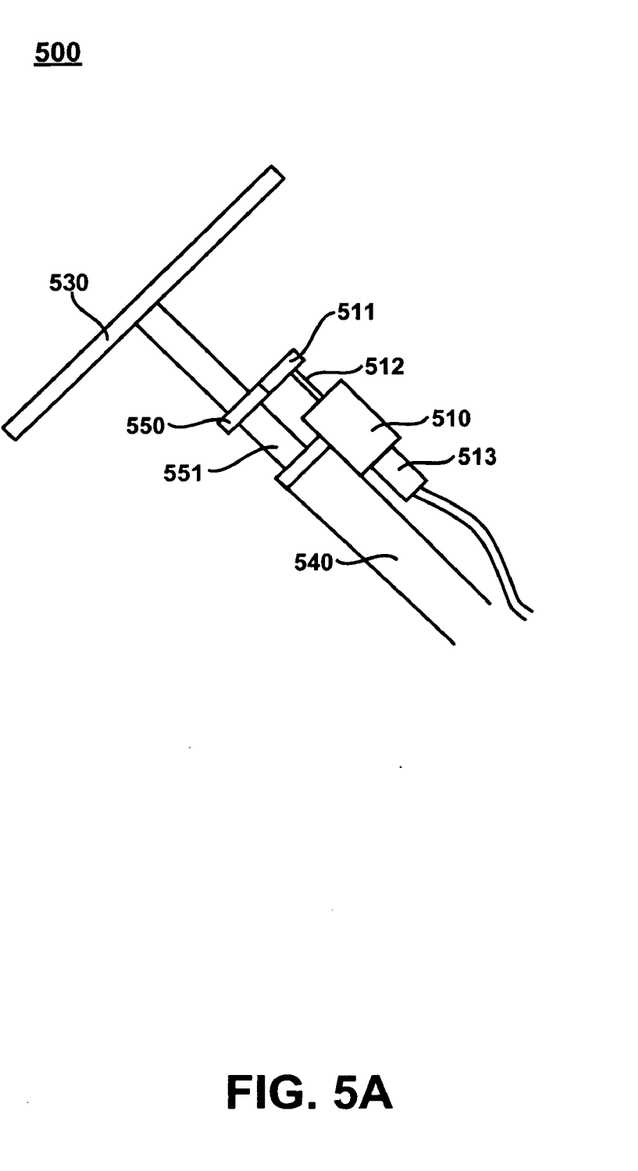
FIGS. 5A and 5B show side and top views respectively of a system for controlling a mobile machine in accordance with embodiments of the present invention.
Figure 5B:
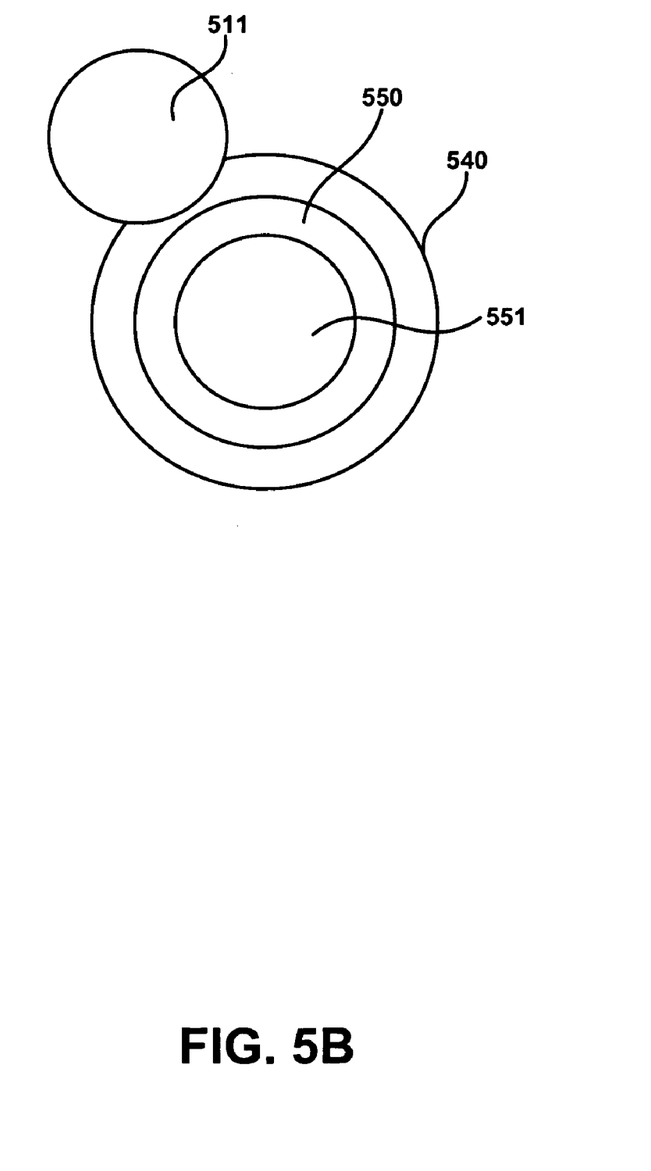

FIGS. 5A and 5B are side and sectional views respectively of a system 500 for controlling a mobile machine in accordance with embodiments of the present invention. In FIG. 5A, the steering component (e.g., electric steering component 131 of FIG. 2) comprises an electric motor 510 which is coupled with gear 511 via shaft 512 and with a motor control unit 513. Motor control unit 413 couples electric motor 510 with steering controller 220 of FIG. 2. In FIG. 5A, electric motor 510 is coupled with steering column 540.

FIG. 5B is a section view of system 500 and shows steering shaft 550 disposed within steering column 540. A gear 551 couples steering shaft 550 with gear 511 of electric steering component 131. In the present embodiment, electric motor 510 turns in a clockwise or counter clockwise direction depending upon the steering command received by motor control unit 513. As a result, gear 511 also turns in a clockwise or counter clockwise direction, thus causing steering shaft 550 to turn due to the force conveyed by gear 551. While the present embodiment recites coupling electric steering component 131 with steering shaft 550 using gears, embodiments of the present invention are well suited for using other mechanical couplings such as a gear and chain, a belt and pulleys, etc.

Figure 6:
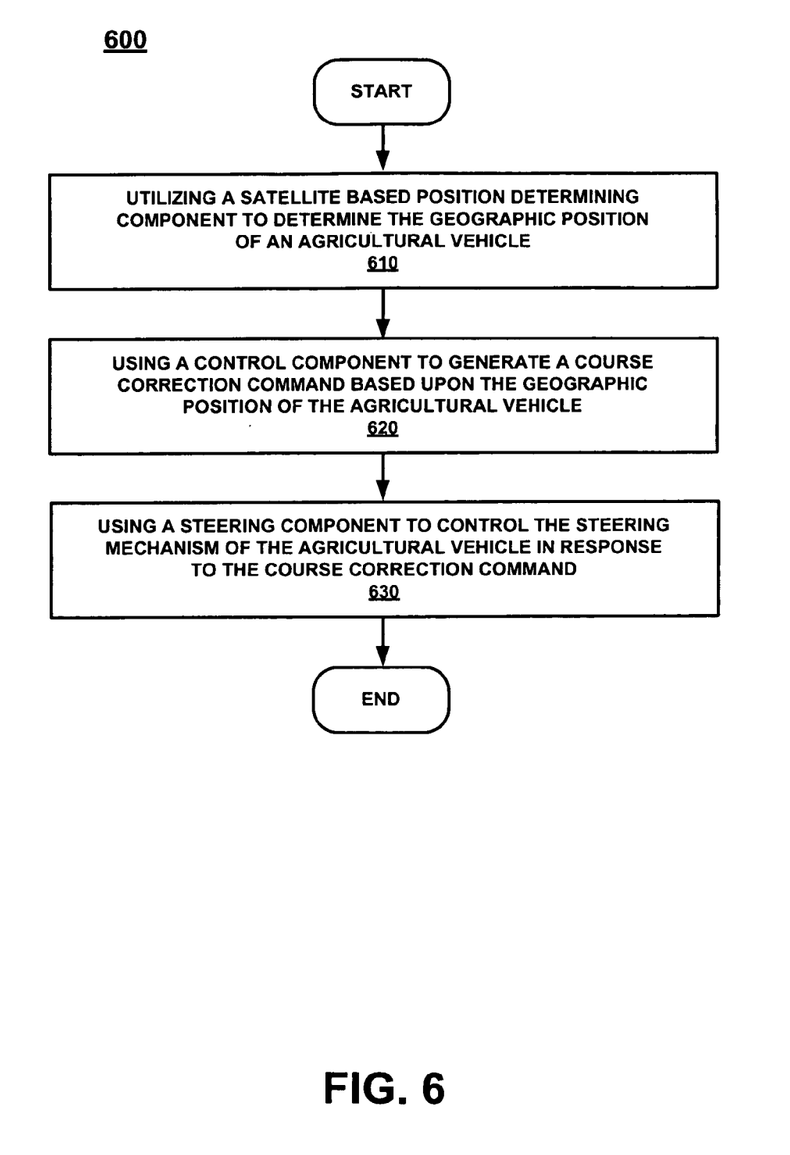
FIG. 6 is a flow chart of a method for controlling an agricultural vehicle in accordance with embodiments of the present invention.

FIG. 6 is a flow chart of a method 600 for controlling an agricultural vehicle in accordance with embodiments of the present invention. In step 610 of FIG. 6, a satellite based position determining component is utilized to determine the geographic position of an agricultural vehicle. As described above with reference to FIG. 1, position determining component 110 is a satellite based position determining system such as global positioning system (GPS) navigation system, a differential GPS system, a real-time kinematics (RTK) system, a networked RTK system, etc. Position determining system determines the location of mobile machine 105 in at least two dimensions in embodiments of the present invention.

In step 620 of FIG. 6, a control component is used to generate a steering command based upon the geographic position of the agricultural vehicle. As described above with reference to FIG. 2, control component 120 is used to generate steering commands for mobile machine based upon geographic data received from position determining component 110. In embodiments of the present invention, control component 120 comprises a vehicle guidance system (e.g., 210 of FIG. 2) which is coupled with a steering controller (e.g., 220 of FIG. 2). Vehicle guidance system 210 uses the position data received from position determining component 110 to determine course corrections for mobile machine 105. Steering controller 220 translates the course corrections into steering commands In step 630 of FIG. 6, a steering component is used to control the steering mechanism of the agricultural vehicle in response to the steering command.

The preferred embodiment of the present invention, a method and system for controlling a mobile machine, is thus described. While the present invention has been described in particular embodiments, it should be appreciated that the present invention should not be construed as limited by such embodiments, but rather construed according to the following claims.

What is claimed is:

1. A system for controlling an agricultural vehicle, said system comprising:
   a position determining component for determining the geographic position of said agricultural vehicle;
   an electric steering component for controlling the steering mechanism of said agricultural vehicle in response to a message, said electric steering component comprising:
      an electric motor coupled with a steering column of said agricultural vehicle; and
      a drive wheel which controls a steering wheel of said steering mechanism;
   a control component comprising an electric steering output and a hydraulic steering output coupled with said position determining component and with a steering component, said control component for generating said message in response to receiving position data from said position determining component said control component further operable for controlling a hydraulic steering component that is coupled with the steering mechanism of said agricultural vehicle in response to said message and said control component is configured for automatically determining whether it is coupled with said steering component selected from the group consisting essentially of said electric steering component and said hydraulic steering component.

2. The system of claim 1 wherein said position determining system is a ground based position determining system.

3. The system of claim 1 wherein said position determining system is a satellite based position determining system.

4. The system of claim 3 wherein said satellite based position determining system is selected from the group consisting of a global positioning system (GPS) system, a differential GPS system, a real-time kinematics (RTK) system, a networked RTK system, a GLONASS system, and a Galileo system.

5. The system of claim 1 wherein said control component generates a control voltage to said electric steering component.

6. The system of claim 1 further comprising a serial communication bus which communicatively couples said control component, said steering component, and said position determining component.

7. The system of claim 6 wherein said serial communication bus is substantially compliant with the controller area network (CAN) protocol.

8. The system of claim 1 wherein said electric motor is directly coupled with an actuator device.

9. The system of claim 1 wherein said electric motor is selected from the group consisting of a permanent magnet brush direct current (DC) motor, a brushless DC motor, a stepper motor, and an alternating current (AC) servo motor.

10. The system of claim 1 wherein said electric motor is coupled with said steering column of said agricultural vehicle.

11. The system of claim 10 wherein an actuator device controls said steering wheel via a sub wheel which is coupled with said steering wheel.

12. The system of claim 1 further comprising a detection component for determining when a user is steering said agricultural vehicle and for initiating disengagement of said steering component in response to said determining.

13. The system of claim 1 wherein said control component formats said message based upon which of said electric steering component and said hydraulic steering component based upon said automatically determining.

14. A method for controlling an agricultural vehicle comprising:
utilizing a position determining component to determine the geographic position of said agricultural vehicle;
using a control component to automatically determine whether it is coupled with a steering component selected from the group consisting essentially of an electric steering wheel actuator and a hydraulic steering component:
using said control component to generate a steering command based upon the geographic position of said agricultural vehicle; and
using said electric steering wheel actuator to control the steering mechanism of said agricultural vehicle in response to said steering command when coupling of said electric steering wheel actuator to the control component is determined.

15. The method as recited in claim 14 wherein said position determining component comprises a ground based position determining system.

16. The method as recited in claim 14 wherein said position determining system comprises a satellite based position determining component.

17. The method as recited in claim 16 wherein said satellite based position determining component is selected from the group consisting of a global positioning system (GPS) system, a differential GPS system, a real-time kinematics (RTK) system, a networked RTK system, a GLONASS system, and a Galileo system.

18. The method as recited in claim 14 further comprising:
generating a control voltage in response to said steering command.

19. The method as recited in claim 14 further comprising:
using a serial communication bus to communicatively couple said control component and said position determining component.

20. The method as recited in claim 19 wherein said serial communication bus is substantially compliant with the controller area network (CAN) protocol.

21. The method as recited in claim 14 wherein said control component is further operable for controlling said hydraulic steering component.

22. The method as recited in claim 14 wherein said electric steering wheel actuator comprises:
an electric motor coupled with said control component; and
an actuator device coupled with said electric motor and configured to actuate the steering wheel of said agricultural vehicle.

23. The method as recited in claim 22 wherein said electric motor is directly coupled with said actuator device.

24. The method as recited in claim 14 further comprising:
formatting said steering command to actuate said electric steering wheel actuator based upon determining that said control component is coupled with said electric steering wheel actuator; and
formatting said steering command to actuate said hydraulic steering component based upon determining that said control component is coupled with said hydraulic steering component.

25. The method as recited in claim 22 wherein said electric motor is selected from the group consisting of a permanent magnet brush direct current (DC) motor, a brushless DC motor, a stepper motor, and an alternating current (AC) servo motor.

26. The method as recited in claim 22 wherein said actuator device comprises a drive wheel which controls said steering wheel of said steering mechanism.

27. The method as recited in claim 22 wherein said actuator device controls said steering wheel via a sub wheel which is coupled with said steering wheel.

28. The method as recited in claim 22 wherein said actuator device is coupled with a steering shaft of said agricultural vehicle.

29. The method as recited in claim 14 further comprising:
determining when a user is steering said agricultural vehicle; and
disengaging said steering component in response to said determining.

* * * * *